Feb. 24, 1953 M. J. PLANEAUX Re. 23,622

FOLDABLE CLOSURE

Original Filed Dec. 16, 1950 3 Sheets-Sheet 1

INVENTOR.
MARVIN J. PLANEAUX

BY Clifford C. Bradbury

ATTORNEY

Feb. 24, 1953 M. J. PLANEAUX Re. 23,622

FOLDABLE CLOSURE

Original Filed Dec. 16, 1950 3 Sheets-Sheet 2

INVENTOR
MARVIN J. PLANEAUX
BY Clifford C. Bradbury
ATTORNEY.

Feb. 24, 1953 M. J. PLANEAUX Re. 23,622

FOLDABLE CLOSURE

Original Filed Dec. 16, 1950 3 Sheets-Sheet 3

INVENTOR.
MARVIN J. PLANEAUX

BY Clifford C. Bradbury
ATTORNEY.

Reissued Feb. 24, 1953

Re. 23,622

UNITED STATES PATENT OFFICE 23,622

FOLDABLE CLOSURE

Marvin J. Planeaux, New Castle, Ind., assignor to New Castle Products, Inc., New Castle, Ind., a corporation of Indiana Original No. 2,599,860, dated June 10, 1952, Serial No. 201,197, December 16, 1950. Application for reissue November 22, 1952, Serial No. 322,175

5 Claims. (Cl. 160—84)

Matter enclosed in heavy brackets [ ] appears in the original patent but forms no part of this reissue specification; matter printed in italics indicates the additions made by reissue.

This invention relates to a foldable closure suitable for closing an opening and extendable into a positon for closing the opening and collapsible for exposing the opening.

This invention is a continuation in part of my joint application for a Foldable Closure, Serial No. 612,816, filed August 27, 1945, which became Patent No. 2,584,111 February 5, 1952.

The chief object of this invention is to tie together [superimposed] *superposed* foldable hinged plates at the top, intermediate position or positions, and bottom of a fabric covered closure so that the various [superimposed] *superposed* hinged plates are caused to move in the same plane as the closure is either expanded or compressed.

To accomplish the tying together of the [superimposed] *superposed* hinged plates, the pintles on which the plates fold extend the full height of the closure, and simultaneously connect the adjacent ends of all horizontally collapsible vertically [superimposed] *superposed* plates. The extended pintles serve as a covering folding means as well as additional closure reinforcement.

In accordance with my invention, the hinged plates, preferably those at the top of the structure, are of lazy tongs construction, and each plate is *connected*, preferably [welded] *by welding*, to one of its pintles so that the pintle is required to rotate correspondingly with the angular movement of the plate to which it is [welded] *connected*. Since the [superimposed] *superposed* plates of other collapsible plate series for the closure are also [welded] *connected* to the same pintles, the lower and intermediate plates are required to move correspondingly with the movement of the top series of plates except for the slight torsional displacement between the tops and bottoms of the pintles due to torsional deflection under strain.

When each of the pintles at the ends of the plates are [welded] *connected* to one plate of each series, a plate of one or more of the series may be broken or omitted entirely, and even so, the series of plates, including ones in which the broken or omitted plates occur, will be caused, by the [welded] *connected* pintles, to follow the movement of the lazy tongs plates which are complete. In fact, one whole series of plates forming one-half of a lazy tongs structure may be omitted in all positions except one; i. e., at the top, the intermediate, or the bottom of the closure, and the hinged plates from which the omissions have been made will follow the angles of the corresponding plates of the complete lazy tongs.

In accordance with my invention, if even only one of the pintles extending lengthwise of the closure is [welded] *connected* to a corresponding lazy tongs plate of another collapsible [superimposed] *superposed* lazy tongs, the upper and lower lazy tongs will be caused to move correspondingly as the lazy tongs are opened or closed, though, because of the torsional deflection of the pintles between the top and the bottom of a tall closure, and because of economical considerations requiring the use of slender pintles, I have found it desirable to weld *or otherwise connect* more than one pintle to the [superimposed] *superposed* plates which it serves, and I have found that smaller diameter pintles can be used if all of the pintles connecting the ends of the collapsible plates are [welded] *connected* to the [superimposed] *superposed* plates of at least the top and bottom series of collapsible plates.

If it is found desirable to use only one or two [welded] *connected* pintles, I have found it advantageous to locate these pintles at the vertical ends of the collapsible structure because, in these positions, the pintles may be made large enough so that they will have only very slight angular displacement between the top and the bottom of the closure. With the two end pintles thus welded or otherwise secured to one of the end plates of each of the series of collapsible lazy tongs, the lazy tongs of all of the thus connected series are caused to move correspondingly. With this arrangement, however, a broken or omitted lazy tongs section will prevent the series of lazy tongs sections in which one member is broken or missing from moving correspondingly with the other lazy tongs structure.

If it is desired to still further stiffen the structure because of the use of slender pintles, some of the pintles connecting the middles of the lazy tongs plates may also be welded *or otherwise connected* to corresponding plates of the [superimposed] *superposed* series of lazy tongs structures.

My invention is illustrated in the accompanying drawings, in which

Figure 1:
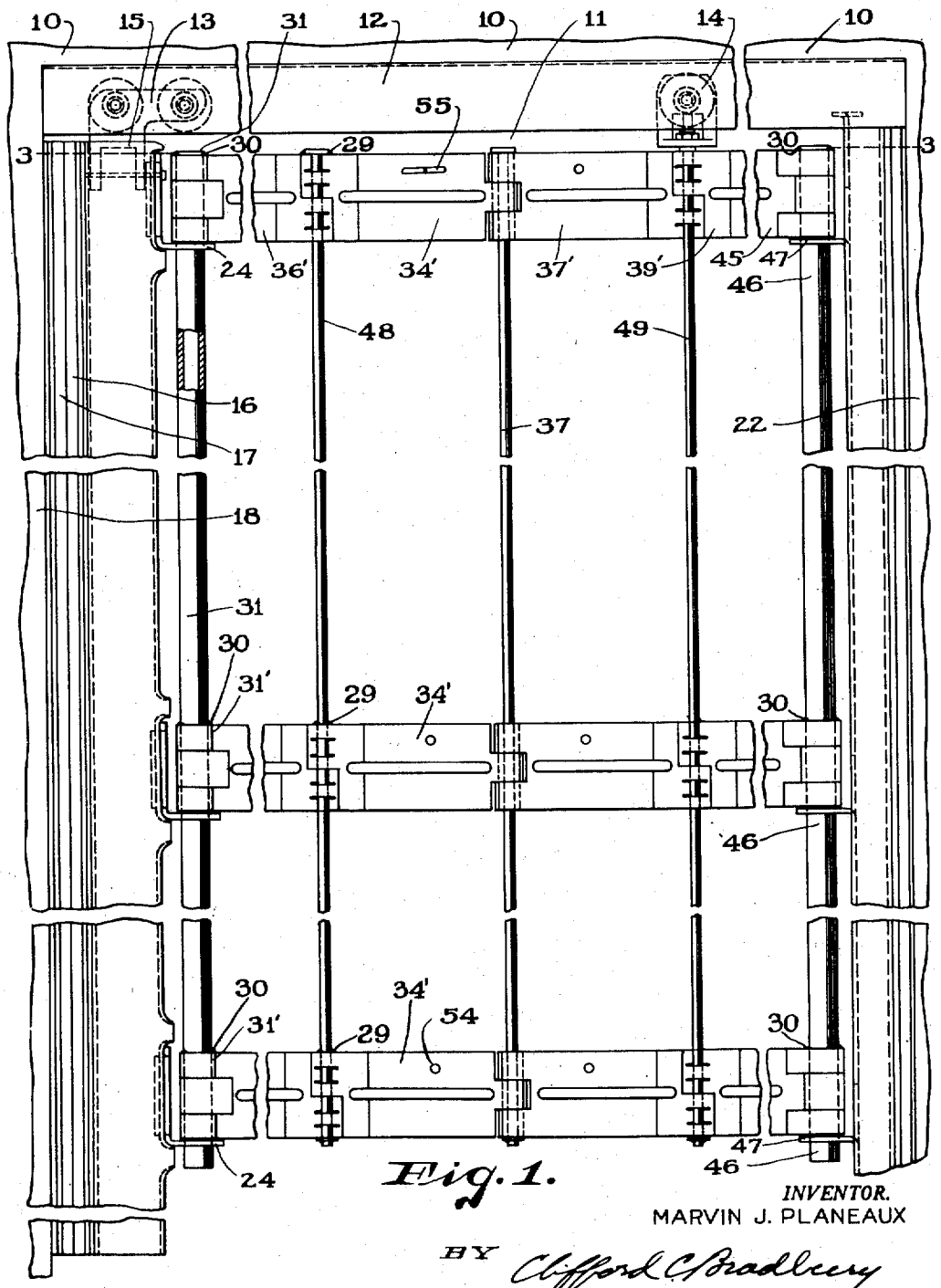
Fig. 1 is a segmental illustration of my structure with the fabric omitted.
Figure 3:
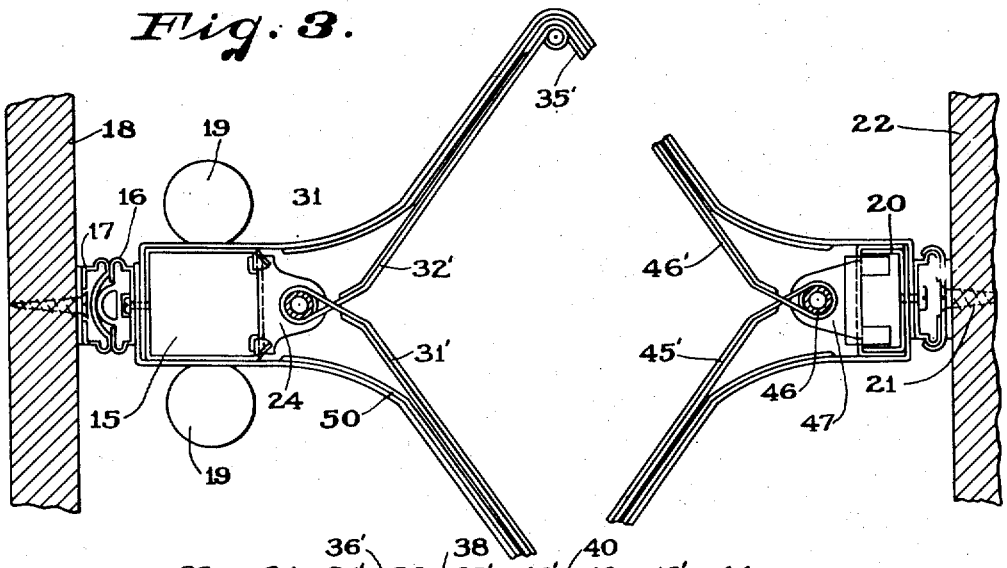
Fig. 3 is a segmental plan taken on the line 3—3 of Fig. 1, but including the fabric cover and omitting the track and suspending rollers.
Figure 2:
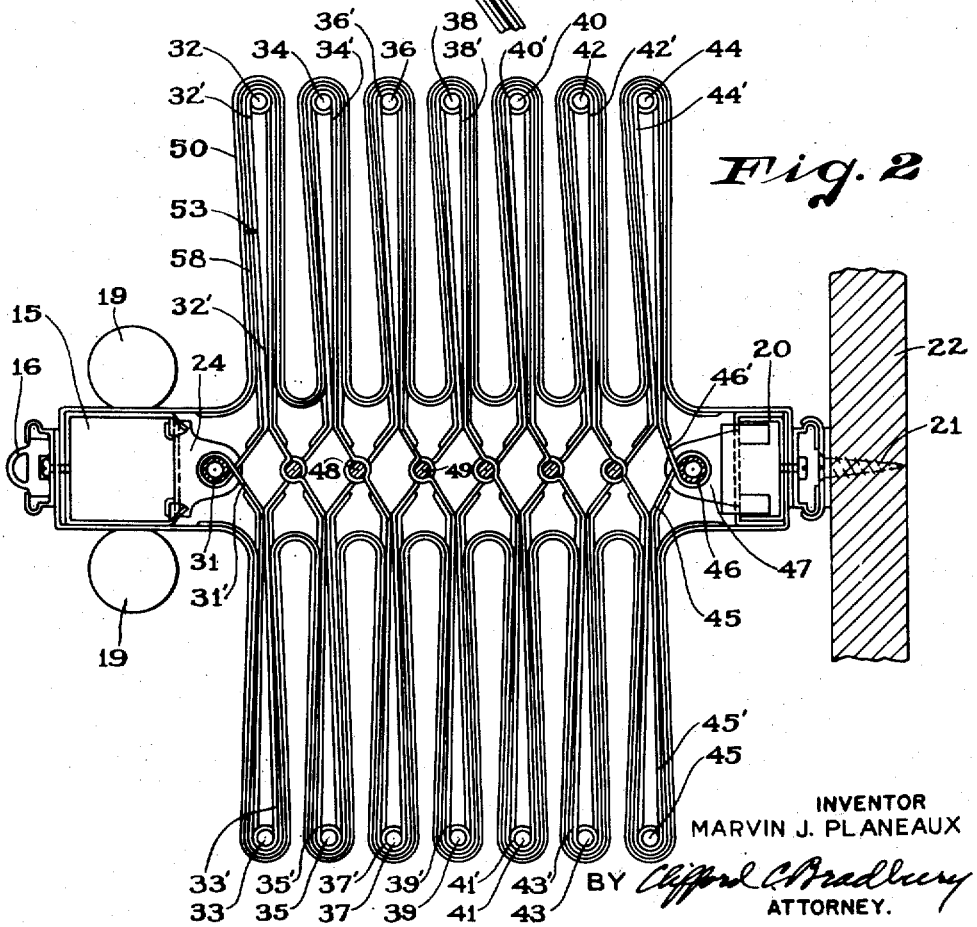
Fig. 2 is a plan view of my folding closure in folded position, including the fabric covering, but omitting the track and suspending rollers.
Figure 4:
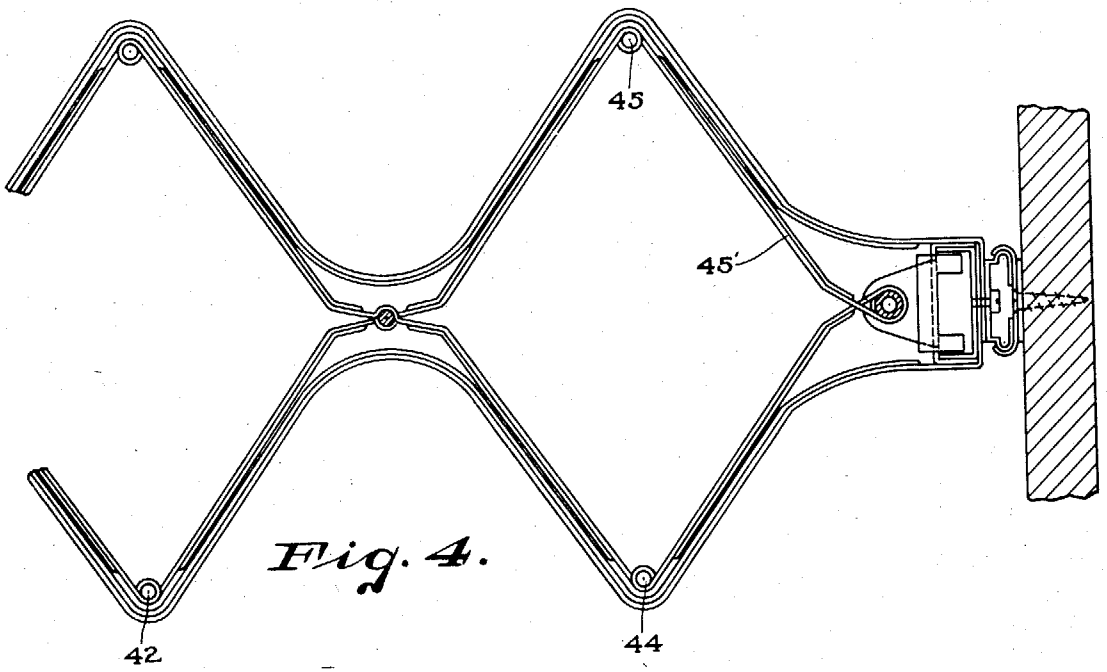
Fig. 4 is a segmental plan showing the manner in which the hinged plates are hinged together at their middles, including the fabric cover and omitting the track and suspending rollers.

Referring particularly to Fig. 1 of the drawings, a wall 10 has an opening 11 therein, with a bottom slotted track 12 extending across it within which suitable trolley structures 13 and 14 roll. The trolley structure 13 supports the lead post 15, while one or more of the trolley structures like 14 support intermediate parts of the closure.

The lead post 15 is provided with a cushion strip 16, which engages a bumper socket strip 17, carried by the vertical part 18 of the wall 10. The lead post 15 is preferably provided with opposite handles 19, and if desired, may be provided also with suitable latch means, not shown, since such means forms no part of the present invention.

The rear post 20 may be of channel section and detachably mounted, as at 21, to the opposite wall 22 of the opening 11. In Fig. 1, the lead post 15 has secured to it suitable bearing members, such as the L-shaped brackets 24, that support the pivotally connected plates of half length. A pintle 31 passes through all of the brackets 24, and has welded, as at 30, or otherwise secured to it, the several half plates 31′ of the several series of hinged plates. The other half plates 32′ *are not connected to the pintle 31 but* are pivoted on [the pintle 31] *it* and are free to rotate thereon.

The opposite ends of each of the half plates 32′ are welded or otherwise secured to the pintle 32. In a like manner, the pintle 33 is welded *or otherwise connected* to one of the ends of each of the full lazy tongs plates 33′. For convenience, the pintles for the ends of the full length hinged plates are numbered consecutively from 32 to 45, and the hinged plates, which are welded or otherwise [secured] *connected* to the pintles, are numbered consecutively from 32′ to 45′. The half length hinge plates 46′ are welded or otherwise [secured] *connected* to the pintle 46, which is pivotally supported in the brackets 47, attached to the rear post 20. Each of the hinged plates is pivoted at its [unwelded] *free* end about the pintle which is [welded] *connected* to the adjacent hinged plate. The full length hinged plates 33′ and 35′, 34′ and 36′, 37′ and 39′, 38′ and 40′, 41′ and 43′, and 42′ and 44′ are pivoted together at their midpoints at which they cross one another. Some of the pintles for the midplate hinges, such as 48, Fig. 1, are illustrated as being welded at 29 to the plates 34′ of the several lazy tongs structures, while certain other pintles, such as 49, are illustrated as attached to trolley structures, such as 14, without being welded or otherwise [rigidly secured] *connected* to any of the hinged plates.

The covering material 50 for the closure is attached to the top and bottom series of hinged plates by means of tapes 51, which are stitched to the fabric of the covering and fastened to each of the plates by fasteners 53, which have heads lying against the outside of the tapes 51, and which have their flat metal ends extended through holes 54 in the plates and bent outwardly, as at 55, Fig. 1, to hold the tape and, consequently, the fabric covering onto the hinged plates.

In the operation of my closure, the welded *or otherwise connected* pintles cause the several lazy tongs structures to collapse or expand in exact unison so that pressure at any place from the top to the bottom of the lead post 15 causes the lead post to move in a perfectly vertical position.

The closure is not permitted to sag between its ends because of the trolleys 14, which may be attached to either one or more of the intermediate pintles 49. If the opening 11 is a wide one, then several trolleys similar to 14 will be used, whereas, if the opening is a narrow one, only one trolley is necessary to keep the closure from sagging. Sagging is also resisted by the fact that the pintles for the ends of the lazy tongs plates are welded *or otherwise connected* to corresponding plates of the several series. In order for the closure to sag, the pintles would have to be bent out of alignment in the several [superimposed] *superposed* hinged sections.

While I have described my invention with reference to the illustrated structure, I do not wish to be unduly limited to the specific structure, many modifications being possible without departing from the spirit and scope of my invention.

I claim:

1. In a closure supporting mechanism, a pair of lazy tongs structures, one at the top and the other at the bottom of the closure, means to support the top lazy tongs structure at its ends and at an intermediate position, a plurality of connected plates included in each of said structures, pintles for the end of the plates of each lazy tongs structure extending vertically of the closure and [rigidly attached as by welding] *connected* to plates of the lower lazy tongs and to corresponding [superimposed] *superposed* plates of the top lazy tongs *structure*.

2. In a closure supporting mechanism, a collapsible series of crossed plates forming a lazy tongs at the top of the closure, means supporting the crossed plate lazy tongs facilitating its opening and closing, vertical pintles for the ends of the crossed plates of the lazy tongs, a series of hinged plates at the bottom of the closure, the said pintles extending from the ends of the crossed plates of the lazy tongs to the ends of the hinged plates at the bottom of the closure and being rigidly attached at the top and bottom to correspondingly [superimposed] *superposed* plates of the lazy tongs and hinged structure.

3. In a foldable closure supporting mechanism, two lazy tongs structures, one across the top and the other across the bottom of the closure, each comprising a plurality of plates successively hinged together at their ends, vertical pintles extending from the top lazy tongs structure to the bottom lazy tongs structure, each pintle being [secured] *connected* at its top to one of the plates of the *top* lazy tongs *structure* and at its bottom to the corresponding plate of the lower lazy tongs *structure*, each plate of each lazy tongs *structure* being [rigidly secured] *connected* to at least one pintle to which the corresponding plate of the other lazy tongs *structure* is [rigidly secured] *connected*.

4. In a foldable closure supporting mechanism, a lazy tongs structure having half hinged plates at each end and a plurality of cross-hinged plates serially [connecting] *jointed* at their ends between the ends of the half hinged plates, one pintle for each plate and each half plate being [rigidly secured as by welding] *connected* to one plate only of the lazy tongs *structure*, a second hinged structure for the closure having plates of equal length as those of the lazy tongs *structure* but located remote from the lazy tongs *structure*, the plates of the second hinged structure being [welded] *connected* to the same pintles as the [superimposed] *superposed* plates of the lazy tongs *structure.*

5. A pair of lazy tongs structures positioned one above the other and having a like number of hinged elements of equal length, a pintle at the end of one of the crossed members of one of the lazy tongs [rigidly attached as by welding] *structures connected* to the said crossed member and [rigidly] connected [as by welding] to the corresponding crossed member of the other lazy tongs *structure,* whereby the crossed members of the two lazy tongs *structures* to which said pintle is [rigidly secured] *connected* are caused to move in the same plane as the lazy tongs *structures* are selectively collapsed and expanded.

MARVIN J. PLANEAUX.

REFERENCES CITED

The following references are of record in the file of this patent or the original patent:

UNITED STATES PATENTS

| Number | Name | Date |
|---|---|---|
| 2,460,157 | Watkins | Jan. 25, 1949 |
| 2,512,736 | Brenner | June 27, 1950 |

FOREIGN PATENTS

| Number | Country | Date |
|---|---|---|
| 186,128 | Germany | July 2, 1907 |